United States Patent [19]

Mercier

[11] 3,741,250

[45] June 26, 1973

[54] PRESSURE VESSEL

[76] Inventor: Jacques H. Mercier, 49 rue de Naples, Paris, France

[22] Filed: Oct. 5, 1971

[21] Appl. No.: 186,704

[30] Foreign Application Priority Data
Oct. 28, 1970 France .............................. 7038833

[52] U.S. Cl. ............................................... 138/30
[51] Int. Cl. ............................................ F16l 55/04
[58] Field of Search ......................... 138/30, 26, 40; 239/89, 96

[56] References Cited
UNITED STATES PATENTS

| | | | |
|---|---|---|---|
| 3,161,208 | 12/1964 | Mercier | 138/30 |
| 3,279,499 | 10/1966 | Mercier | 138/30 |
| 3,322,154 | 5/1967 | Mercier | 138/30 |

*Primary Examiner*—John Petrakes
*Assistant Examiner*—Frederick R. Schmidt
*Attorney*—Arthur B. Colvin

[57] ABSTRACT

This invention relates to a pressure vessel comprising a rigid container having two ports, a flexible separator in the form of a bladder being disposed in the interior of said container and dividing it into two fluid chambers which are respectively in communication with said ports, and a guide or flow member in the general shape of a hollow column is fixed at one of its ends to the container at one of the ports thereof and extends axially inward into the container, the flow member being adapted to permit an appropriate flow of fluid in two directions and having a perforated tubular central member and an encompassing permeable sleeve formed from a stack of juxtaposed grooved washers which at least partially enclose the tubular member and which is retained between two terminal abutments.

5 Claims, 5 Drawing Figures

3,741,250

PATENTED JUN 26 1973

PRESSURE VESSEL

As conducive to an understanding of the invention, it is noted that where such pressure vessels are of the type having a rigid container in which a separator is positioned in the form of an elongated bladder or sleeve between the two fluids under pressure contained therein which is compressed during operation, and a relatively large rate of flow of fluid is required into and out of the ports which are in communication respectively with the chambers defined on each side of the separator, it is essential that the bladder be restrained from extrusion from either of such ports.

More particularly, where the bladder is charged with gas under pressure, it is important that a high rate of flow be permitted into the bladder to expand the latter. Where a large port is provided to permit such high rate of flow, when the bladder is compressed, if it should extrude through such port, injury or destruction of the bladder would occur.

Where, to prevent such extrusion of the bladder yet permit a high rate of flow of gas thereinto, a perforated tube extends axially from the gas port of the container into the bladder, unless such perforated tube is extremely strong, the lateral forces exerted thereagainst by compression of the bladder would cause breakage of said tubular member.

Furthermore, if the perforations in the tubular member are too large, extrusion of the bladder may occur and if too small, an insufficient rate of flow may result.

It is accordingly among the objects of the invention to provide a pressure vessel of the above type which has a rigid central guide member positioned in the bladder thereof, which guide member will permit a high rate of flow therethrough in both directions without likelihood of extrusion of the bladder and which pressure vessel and associated guide member may readily be fabricated at relatively low cost and may readily be disassembled for cleaning.

According to the invention the pressure vessel comprises a rigid container having a deformable partition therein defining two chambers for fluid each having a fluid passageway or port leading thereinto and an elongated central guide or flow member for said partition which is preferably a bladder, is positioned in the chamber defined in the interior of said bladder. The central guide member comprises a rigid hollow tube secured at one end in one of said ports and in communication therewith, the other end of said tube being closed. The hollow tube has a plurality of perforations therein and a porous sleeve encompasses said tube. The sleeve comprises a stack of thin washers, preferably having grooves in at least one surface thereof which define a multiplicity of passageways between the interior of the sleeve, which is in communication with the interior of the hollow tube through the perforations therein, and the interior of the bladder.

In the accompanying drawings in which is shown one or more of various possible embodiments of the several features of the invention:

Figure 1:
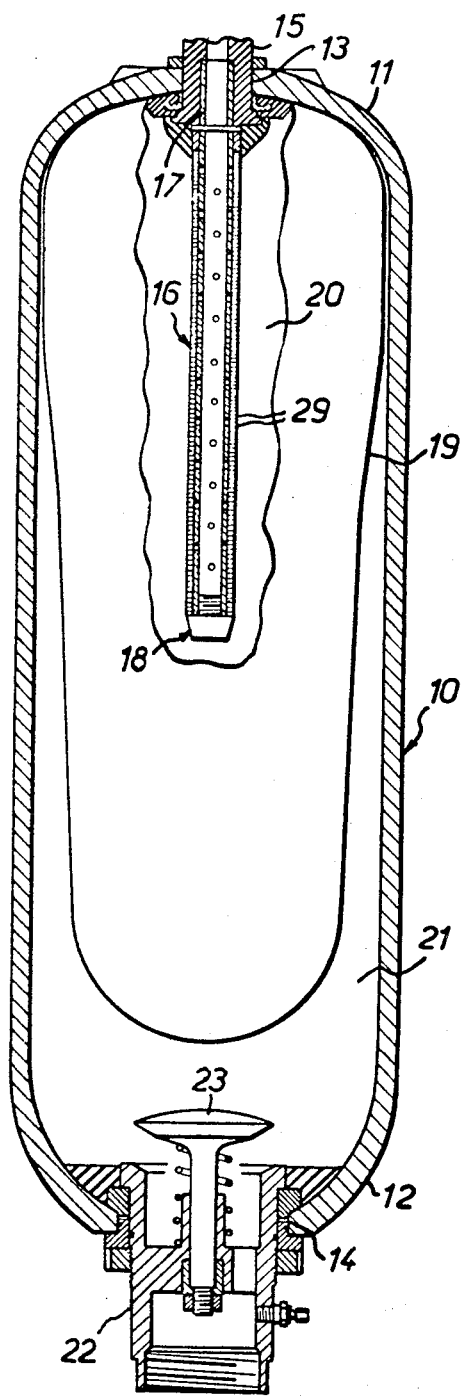
FIG. 1 is longitudinal cross sectional view of a pressure vessel according to the invention.
Figure 2:
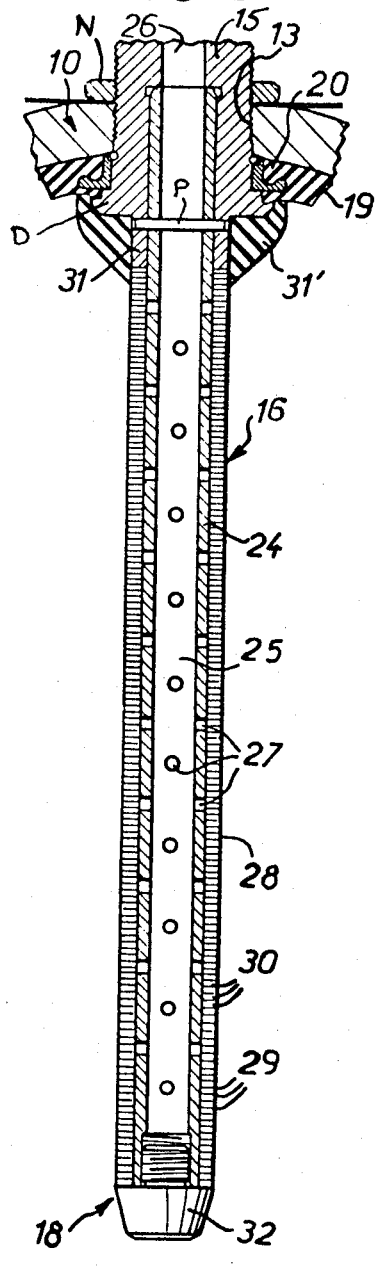
FIG. 2 is a detail longitudinal sectional view on an enlarged scale of the central guide or flow member.
Figure 3:
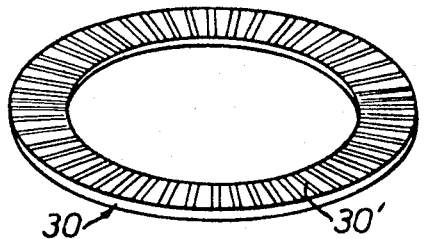
FIG. 3 is a perspective view of one of the washers from which the stack is formed.

Referring now to the drawings, as shown in FIGS. 1 to 3, the pressure vessel comprises a container 10 of strong rigid material such as steel, cast aluminum or the like, capable of withstanding high pressures and having a pair of ports 13, 14 in the hemispherical ends 11 and 12 thereof, said ports being axially aligned.

The container 10 has a partition 19 therein intervening between ports 13 and 14 and defining a variable volume chamber on each side. The partition 19 preferably is a collapsible and expansible bladder of resilient material such as rubber or synthetic plastic of like physical characteristics, which is distended but substantially unstretched condition is smaller than the cavity of container 10 and has its longitudinal axis aligned with the ports 13 and 14.

The bladder 19 is securely affixed in the container 10, preferably by means of a hollow fitting 15 which has an axial stem protruding from port 13 and locked in place by a nut N. The mouth of the bladder encompasses the portion of the stem positioned inwardly of the container and is secured thereto as at 20, the inner end of the stem having an enlarged portion defining a base disc D. Positioned in the bore of the fitting 15 is one end 17 of a tube 24 which extends axially into the container and more particularly into the bladder 19, the inner end 18 of the tube being located substantially midway between the ends of the bladder. The tube is of suitable rigid material such as stainless steel, or the like capable of withstanding the lateral forces applied thereagainst.

As shown in FIG. 2, the tube 24 is retained in the fitting by means of a pin P. The tube 24 has a plurality of perforations or orifices 27 therethrough which provide communication to the interior or bore 25 of the tube 24.

Communication is provided to the inlet or upper end of the tube 24 through the bore 26 of the fitting 15 and the lower end of the tube 24 is closed in the manner hereinafter to be described Encompassing the tube 24 is a perforated sleeve 28 in the form of a stack of juxtaposed washers 30, clearly shown in FIG. 3. The washers 30 can be made of any suitable material such as a semi-rigid material, for example, soft metal or plastic which is sturdy yet has sufficient flexiblity to permit effective contact of the bladder thereagainst without injury to the bladder.

The washers 30 are relatively thin, more particularly their thickness is substantially smaller than their diameter and although the thickness to diameter ratio may vary between 10 to 100 in the illustrative embodiment, the diameter is preferably 70 times the thickness and desirably all of the washers are of the same thickness.

The washers may be flat as shown in FIG. 3 or slightly undulating. Where the washers are flat, they have grooves 30' on one or both surfaces so that when the washers are juxtaposed, the grooves which extend from the interior of the washer to the exterior thereof, provide at their opposed ends a plurality of openings which combine to permit a large flow therethrough but are small enough to prevent extrusion of the bladder. More particularly, the openings 29 defined on the exterior of the stack of washers are considerably smaller than the perforations 27 in the tubular member 24. Due to the presence of a large number of narrow transverse passageways formed by the grooves 30', there will be a large rate of flow of fluid through the stack thereby avoiding excessive loss of head regardless of the direction of flow. If there should be any heating due to the high rate of the flow of the passage, the heat will be dissipated through the multiplicity of washers and due to the resilience of the stack, no breakage will occur.

As is clearly shown in FIG. 2, the stack is positioned on the tube 24 between the inner end 31 of the fitting 13 and the shoulder of a headed screw 32 which is threaded in the lower end of the tube 24. The base disc D is encompassed by a flexible grommet 31' which also encompasses the inner end 31 of the fitting, said grommet having a curved outer surface against which the portion of the bladder secured to the fitting may abut when the bladder is compressed to prevent sharp folds.

The guide or flow member 16, above described, is thus positioned in the fluid compartment 20 defined in the interior of the bladder, the exterior of the latter defining a fluid compartment 21 in association with the inner wall of the container. The port 14 is controlled by a poppet valve 23 normally spring urged to open position and slidably mounted in a fitting 22 secured in the port 14.

In the embodiment shown in FIGS. 1 and 2 the porous sleeve defined by the multiplicity of washers 30 extends substantially the entire length of the rigid tube 24.

Figure 4:
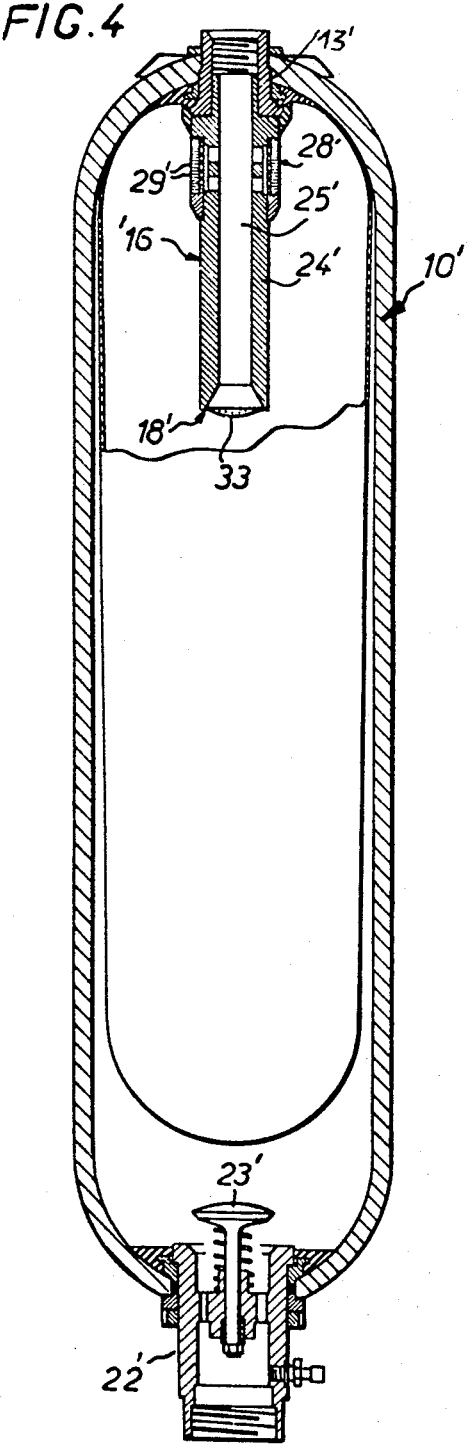
FIG. 4 is a view similar to FIG. 1 of another embodiment of the invention.
Figure 5:
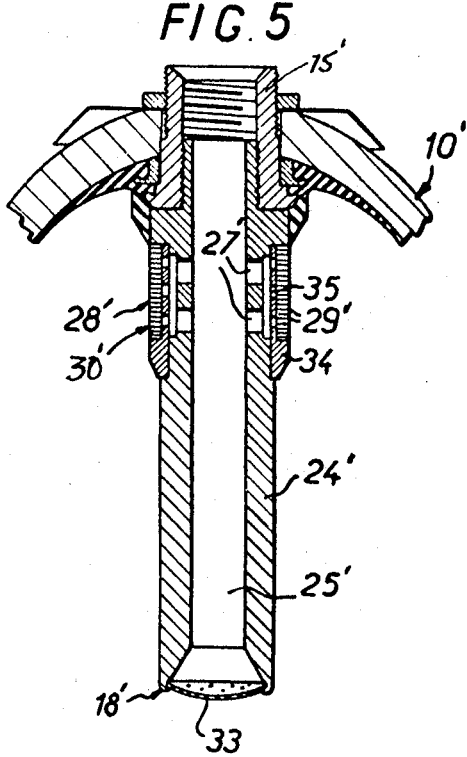
FIG. 5 is a detail longitudinal sectional view of the guide or flow member of the embodiment of FIG. 4.

In the embodiment shown in FIGS. 4 and 5 parts corresponding to those of FIGS. 1 and 3 have the same reference numerals primed. More particularly, in the embodiments of FIGS. 4 and 5 the porous sleeve 28' forms only a part of the flow member 16' and more particularly the portion of the flow member which is adjacent the port 13' of the container 10'. More particularly, as shown in FIG. 5, the rigid tube 24' has perforations 27' adjacent its upper end which is secured to the fitting 15'.

To assemble the porous sleeve 28', an annulus or ring 34 is provided encompassing the portion of the tubular member 24' having the perforations 27', the ring 34 also having a plurality of perforations 35 which are smaller than the perforations 27'. The sleeve 28' is also formed by a stack of thin washers 30' forming a plurality of openings 29'.

The end 18' of the bore 25' of tubular member 24' is covered by a perforated plate or screen 33.

With the constructions above described, not only will the internal guide or flow member 16, 16' prevent excessive folding of the bladder when it is compressed, but due to the plurality of passageways formed by the grooved washers, and particularly with respect to the embodiment of FIGS. 1 and 2, a high rate of flow will be provided through the member 16, 16' to insure rapid transfer of fluid into and out of the unit without excessive heating and without likelihood of injury to the bladder when it presses against the central guide member due to the small openings provided therein.

Having thus described my invention, what I claim as new and desire to secure by Letters Patent of the United States is:

1. A pressure vessel comprising a rigid container having a deformable partition therein defining two chambers for fluid, said container having two ports leading respectively into said chambers, a central flow member in one of said chambers, said central flow member having one end secured to the container and having a central bore in communication with the port associated with said chamber, said flow member comprising a rigid tube extending axially in said container, said rigid tube having a plurality of perforations therein and a sleeve of impermeable material comprising a stack of juxtaposed washers, each washer being conformed so that when the washers are juxtaposed to form a stack, narrow passageways will be provided between adjacent washers from the interior to the exterior of the stack, said sleeve encompassing at least a portion of said rigid tube permitting flow of fluid therethrough from the bore of said rigid tube into the chamber in which the flow member is positioned.

2. The combination set forth in claim 1 in which said washers are undulated, whereby when the washers are juxtaposed to form a stack, passageways will be defined between adjacent pairs of washers from the interior to the exterior.

3. The combination set forth in claim 1 in which a pair of longitudinally spaced rigid abutments are associated with said rigid tube and said stack of washers is retained in clamped relationship between said rigid abutments.

4. A pressure vessel comprising a rigid container having a deformable partition therein defining two chambers for fluid, said container having two ports leading respectively into said chambers, a central flow member in one of said chambers, said central flow member having one end secured to the container and having a central bore in communication with the port associated with said chamber, said flow member comprising a rigid tube extending axially in said container, said rigid tube having a plurality of perforations therethrough and a permeable sleeve comprising a stack of juxtaposed washers each having grooves in at least one surface thereof, the grooves in said washers when the latter are juxtaposed, providing narrow passageways from the interior to the exterior, said sleeve encompassing at least a portion of said rigid tube permitting flow of fluid therethrough from the bore of said rigid tube into the chamber in which said flow member is positioned.

5. The combination set forth in claim 4 in which said rigid tube has a plurality of perforations adjacent its retained end and said stack of washers encompasses said rigid tube only in the region of said plurality of perforations, the inner end of said rigid tube having a perforated screen extending thereacross and the portion of said rigid tube between said perforated screen and the adjacent end of the stack of washers being devoid of openings.

* * * * *